INVENTORS
DOUGLAS R. HILLIER
CORNELIUS D. RADER
BY SVEIN B. RASMUSSEN

ATTORNEYS

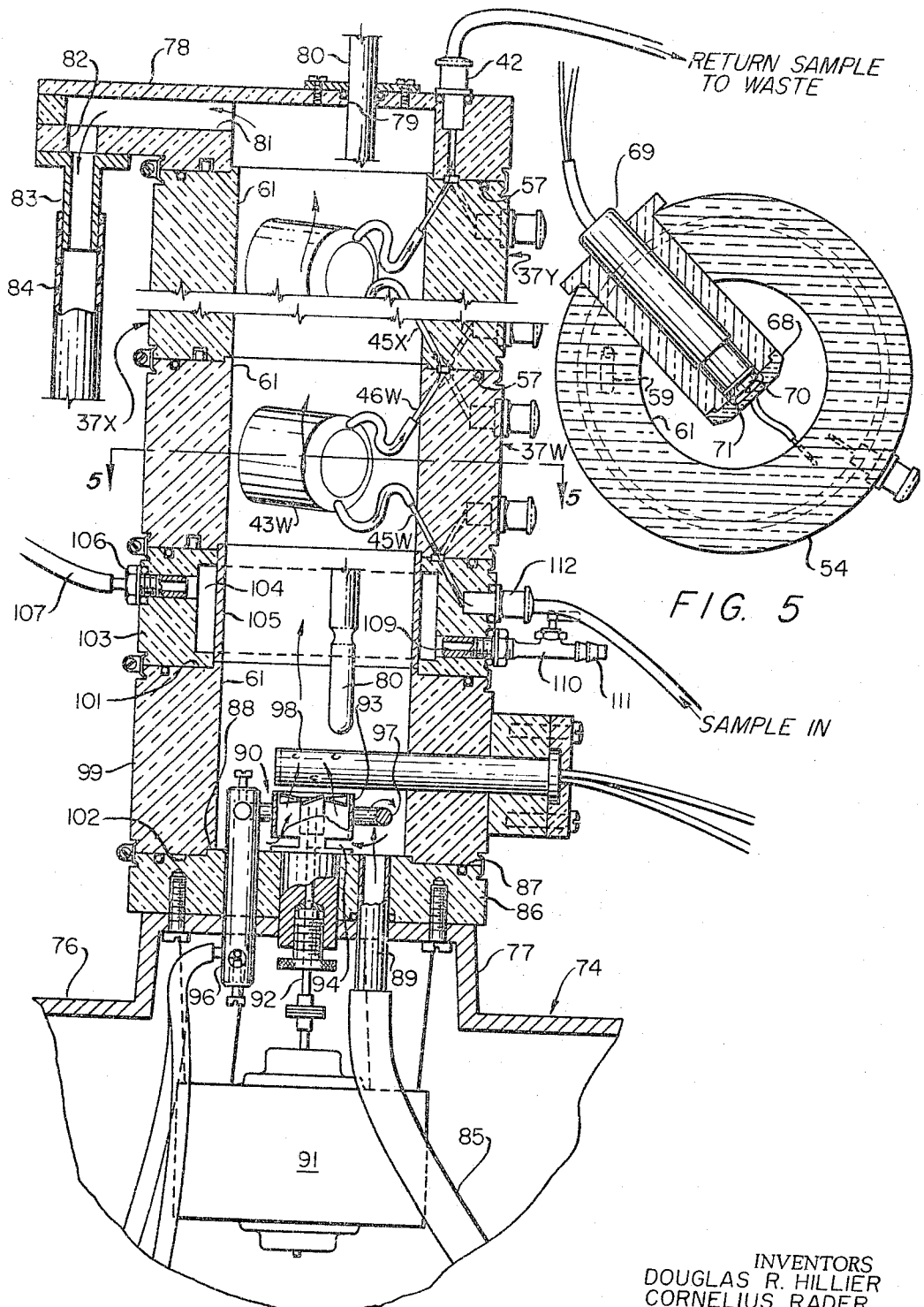

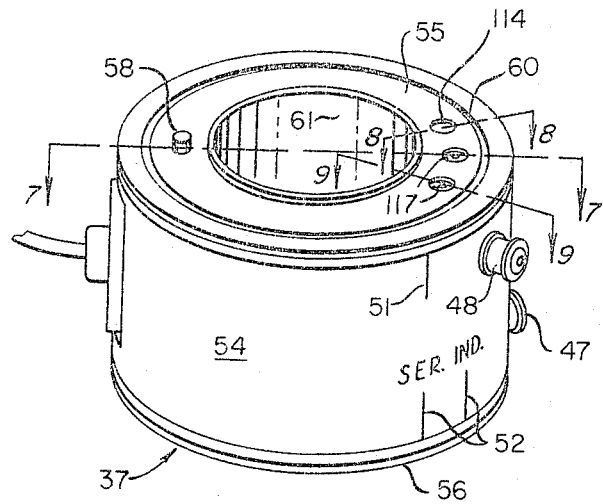
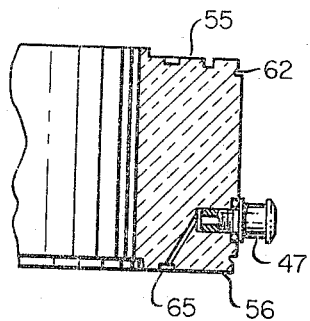
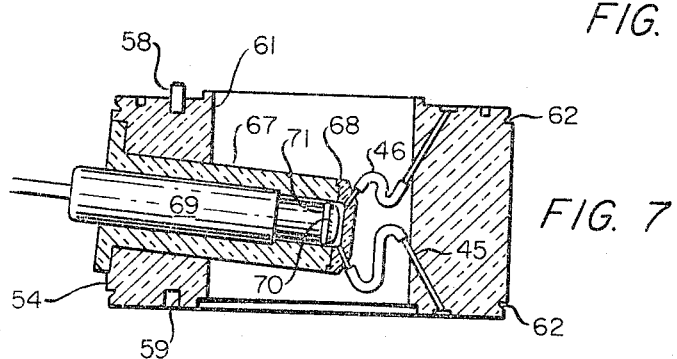
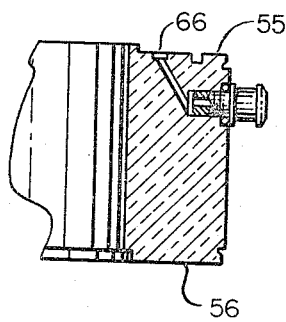
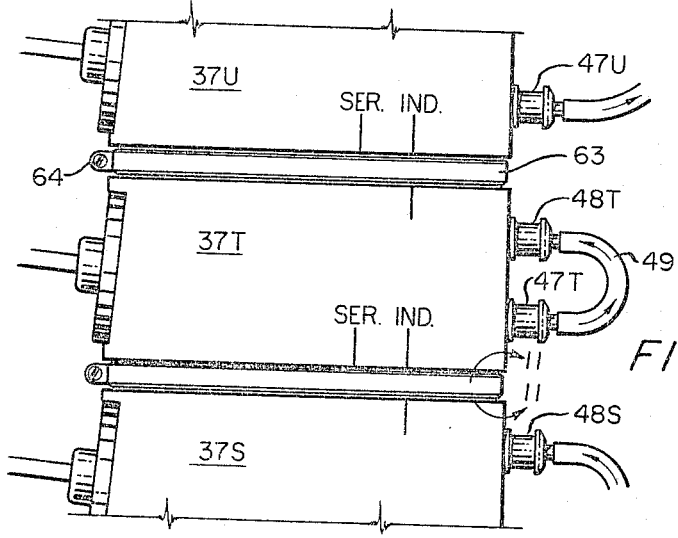

United States Patent Office 3,327,204
Patented June 20, 1967

3,327,204
FLUID SAMPLE EXAMINING APPARATUS
Douglas R. Hillier, Palo Alto, Cornelius D. Rader, San Jose, and Svein B. Rasmussen, Mountain View, Calif., assignors to Beckman Instruments, Inc., a corporation of California
Filed Apr. 15, 1963, Ser. No. 272,964
9 Claims. (Cl. 324—30)

This invention relates to fluid sample examining apparatus and more particularly to such apparatus wherein a plurality of inspections of fluid sample can be made simultaneously.

A fluid sample, such as a blood sample, can be examined for certain purposes by depositing a small amount of sample in a cuvette or small test tube. One of various electrical probes is then inserted into the sample to inspect, measure or examine such things as the hydrogen ion concentration, i.e. the pH, or the $pO_2$, or $pCO_2$ of the sample. These tests have traditionally been made on a one-at-a-time basis. Examining sample in this manner insures freedom from contamination from one test to the next but has certain readily apparent manipulative disadvantages. Furthermore, the amount of required sample is also relatively large and may not always be available.

A general object of the present invention is the provision of improved fluid sample examining apparatus providing a practicable solution to these and certain other problems.

Another object of the invention is to provide fluid sample examining apparatus wherein a plurality of examinations can be made simultaneously on a single sample.

Still a further object of the invention is to provide a modular construction whereby a plurality of modules can be interconnected to run simultaneous examinations of a single fluid sample.

Apparatus of the kind described is particularly useful for laboratory examinations of fluid sample. In this utilization it is not uncommon to desire to apply a plurality of tests to a plurality of samples, as taken from different people, for example.

Thus, another object of the invention is to provide fluid sample examining apparatus which can readily be employed to provide several simultaneous examinations of a plurality of fluid samples.

These and other objects of the invention will be more readily apparent from the following description of a preferred embodiment of the invention when considered with the drawings, in which:

FIGURES 1 and 2 diagrammatically represent an arrangement according to the invention;

FIGURE 4 is an elevation view mostly in section, of apparatus according to the invention;

FIGURE 5 is a sectional view taken along the line 5—5 of FIGURE 4;

FIGURE 6 is a perspective view of a modular unit according to the invention;

FIGURE 7 is an elevation section view taken along the line 7—7 of FIGURE 6;

FIGURE 8 is a detail view in section taken along the line 8—8 of FIGURE 6;

FIGURE 9 is a detail view in elevation section taken along the line 9—9 of FIGURE 6;

FIGURE 10 is an elevational view of a portion of the apparatus according to the invention specially conditioned to serially connect two modular units while skipping over an intermediate modulator unit; and FIGURE 11 is an enlarged detail view taken along the line 11—11 of FIGURE 10.

In general, an apparatus for examining a fluid sample includes a first and second cuvette, or other examination chamber. As will be understood by those skilled in this art, and as used herein, a cuvette usually is a container formed to include a small examination chamber of test tube-like configuration and dimension. Each cuvette is provided with inlet and outlet passages, preferably of capillary dimension, in fluid communication therewith. Means are provided which serve to couple the outlet passage of the first cuvette to the inlet passage of the second cuvette. In addition, means are provided to inject fluid sample into the inlet of the first cuvette and means are associated with the outlet passage of the second cuvette for withdrawing the fluid sample therefrom. Accordingly, a single fluid sample can be injected for simultaneous inspection in both cuvettes by injecting the sample into the inlet of the first cuvette. The cuvettes are formed in modular blocks whereby any number of cuvettes can be interconnected one to the other to form a series thereof. The blocks are connected by readily releasable means.

In another embodiment the blocks are further provided with inlet and outlet connection means whereby any one block can be "indexed out" of the series to be operated independently. When any one block is indexed to operate independently, inlet and outlet connections carried by the indexed block register with the remaining blocks to provide inlet and outlet connections for fluid paths therethrough.

Figure 1:
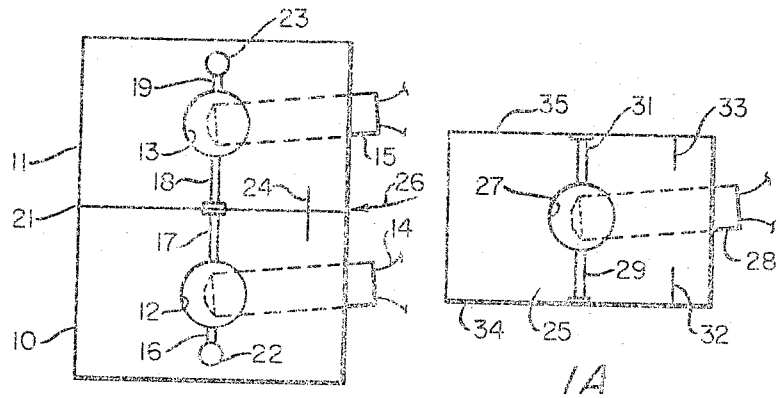
Figure 2:
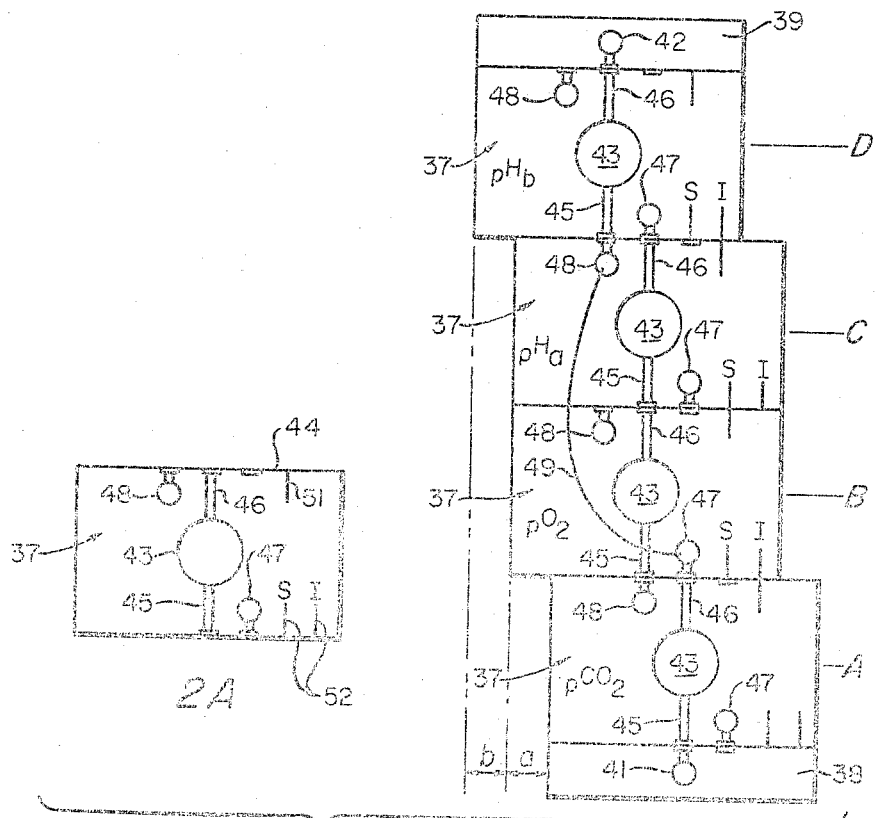

Prior to describing the preferred equipment in detail, a general understanding of the apparatus can best be obtained by referring to the diagrammatic arrangement in FIGURE 1 and also FIGURE 2. A pair of blocks 10, 11 of substantially identical construction are each formed to include a cuvette or other examination chamber 12, 13 formed and adapted to receive an electrical probe 14, 15, respectively. Probes 14, 15 are each provided with a sensitive tip member. Each cuvette 12, 13 is in fluid communication with an inlet and outlet passage 16, 17 and 18, 19, respectively, formed in blocks 10, 11. Where the fluid examination chamber is a cuvette for small volumes of sample, passages 16–19 are preferably of capillary dimension. One end of each passage 17, 18 terminates at a sealed interface 21 formed by sealing surfaces on the top and bottom respectively, of blocks 10, 11. Syringe receiving fluid transfer connections 22, 23 or other suitable connecting means for supply and return of sample are carried on an exposed surface of blocks 10, 11, respectively.

As thus arranged, a hypodermic syringe, for example, containing fluid sample, can be connected to inject sample via fluid transfer connection 22 through a series of both cuvettes 12, 13 until sample appears at connection 23. The ends of passages 17, 18 remote from their respective cuvettes are aligned by means of the indexing scribe marks 24. As further shown in FIGURE 1, if additional cuvettes are desired to be employed for still further examinations to be made to the sample, a modular block 25 can be interposed between the sealing faces of blocks 10, 11 as indicated by arrow 26. Block 25 is formed with an examination chamber 27 adapted to receive probe 28. Chamber 27 is in fluid communication with an inlet passage 29 and an outlet passage 31. Scribe marks 32 and 33 serve to align the ends of passages 29, 31 which terminate in sealing surfaces 34, 35, respectively.

As shown in FIGURE 2, a multiple modular cuvette apparatus is schematically represented wherein a modular unit 37 is shown in FIGURE 2A and which can be assembled with a plurality of like units between a pair of end closure members 38, 39 each provided with a fluid transfer connection 41, 42, respectively. Connections 41, 42 are carried on an exposed surface of members 38, 39 and can be formed as a hypodermic style connection for receiving a syringe of sample.

In general, a modular unit 37 is provided as shown in FIGURE 2A and comprises means defining a fluid sample examination chamber, such as cuvette 43, formed in block 44. Inlet and outlet passages 45, 46 preferably of capillary dimension, as used with small volume cuvettes, are in fluid communication with chamber 43. A pair of fluid transfer connections, for example hypodermic syringe connections 47, 48 are carried by the module for return and supply, respectively, of fluid sample examined in adjacent modules of like construction as for example, as arranged and shown in FIGURE 2. The lateral displacement between connection 47 and passage 45 and connection 48 and passage 46 is dimensioned whereby, in a series of modules 37, each is readily positionable to selectively connect the outlet passage 46 of one module to the inlet passage 45 of the next, on the one hand, to form a series, or if desired to connect the outlet 46 of one to a fluid sample return connection, such as 47 as carried by the next adjacent module, while at the same time connecting a fluid sample supply connection, such as 48, carried by the module so positioned into alignment with the inlet passage 45 of the next. (See for example, modules 37C, 37D in FIGURE 2.

A general understanding of the apparatus can be readily gained from examination of FIGURE 2. As will be more fully explained below, the modules are preferably formed as circular blocks. However, the blocks can be rectilinear if desired and for purposes of illustration in FIGURE 2 have been so indicated.

Thus, the arrangement in FIGURE 2 is assumed to be set up to provide a pair of tests to each of two different fluid samples. One sample will be examined for $pCO_2$ and $pH_b$, while the other sample will be examined for $pO_2$ and $pH_a$. These tests are to be conducted as previously noted by inserting suitable known probes into the examination chamber of each. The four modules have been designated A, B, C, D. Portions of the various modules will be identified by the provision of a postscript A, B, C, or D, respectively.

Thus to interconnect modules A and D for the first sample, connection 41 is positioned to lead into passage 45A and 46A is coupled to connection 47B. Connection 47B is coupled by a small diameter jumper line 49 to connection 48C. Connection 48C supplies fluid to inlet passage 45D through cuvette 43D, outlet passage 46D and returned to a suitable waste container from fluid return connection 42.

The other fluid sample is examined in modules B and C by connecting them in series, one to the other. Thus, fluid supply connection 48A leads into inlet passage 45B, cuvette 43B and the outlet 46B is disposed to be connected to inlet passage 45C and subsequently, the fluid sample is returned to a waste container from fluid return connection 47D.

It will be noted that to aid in aligning the various connections indexing means are provided (FIGURE 2A). The indexing means includes a single scribe mark 51, scribed at the upper edge of an exposed surface of module 37 and a pair of scribe marks 52, marked by the letters "S" and "I" and disposed at the lower edge of module 37 on an exposed surface. Scribe mark 52S when aligned with mark 51 of the module therebeneath serves to interconnect the two modules in "series" one with the other. This can be shown as between modules 37B and C, in FIGURE 2. Where it is desired to operate one of the modules "independent" of the module therebelow, the upper of the two modules, as for example 37D in FIGURE 2, is displacd a predetermined distance to match up scribe mark 52I with scribe mark 51 beneath. Note modules 37C and 37D.

In FIGURE 2 the lateral displacement of one module with respect to the module beneath is shown by the dimension $a$ or $b$. In the case of round modules the displacement distances represent arcuate displacement as distinguished from lateral displacement.

According to a preferred embodiment of the apparatus, a module 37 is provided, as shown in FIGURES 6 through 9, generally comprising a block 54 formed to include a pair of sealing faces 55, 56.

Fluid transfer connections 47, 48 lead via capillary passages to ports 65 and 66, formed in faces 56, 55, respectively. The ends of inlet and outlet passages 45, 46 remote from chamber 43 terminates in faces 56, 55, respectively and are respectively disposed in predetermined spaced relation with respect to ports 65, 66 to provide, in a series of modules 37, interconnections readily positionable to selectively connect the outlet passage of one module to the inlet passage of the next, or to connect the outlet passage of one to a fluid transfer connection carried by the next while connecting a fluid transfer connection carried by the former to the inlet passage of the latter. Accordingly, as viewed from above, ports 65, 66 are arcuately displaced 15° laterally of the ends of passages 45, 46 formed in the sealing faces. Similarly scribe marks 52 are separated by 15° arcuate displacement to correspond therewith.

Faces 55, 56 are adapted to form a sealed interface with the face of another module of like construction. Thus, face 55 carries an O-ring 57 near the peripheral edge of surface 55. O-ring 57 is adapted to abut the flat surface of face 56 when a similar module is positioned adjacent thereto. Face 55 carries an upwardly extending stud 58 disposed to be inserted in an arcuate groove 59 formed in surface 56 (FIGURE 7). Accordingly, when a pair of modules 37 are disposed with face 55 in abutment with O-ring 57, one of the modules can be rotated within the limits of groove 59, as desired. Block 54 is formed to include an opening 61 for passing circulating water therethrough.

Means are provided to prevent the circulating water which passes through opening 61 from escaping via the sealed interface. Thus, on the outer cylindrical surface of block 54 there is formed a pair of retaining grooves 62. An encircling retaining ring 63 (FIGURES 10 and 11) can be tightened therearound as by screw 64 to provide a readily releasable sealed interface which can be easily repositioned while maintaining a liquid tight seal.

As shown in FIGURE 11 the upper and lower edges of band 63 are provided with inwardly turned surfaces adapted to facially abut coacting surfaces formed in grooves 62. Thus, by tightening the ends of band 63 by means of screw 64 faces 55, 56 are drawn together to lock the modules in an aligned relation with a sealed interface therebetween. The escape of circulating water radially of the stack is thereby prevented even during realignment of the stack. Since water is present radially inwardly of O-rings 57, when the module is connected in series with the module below, a fluid path permitting the escape of circulating water could be traced from opening 61 through the interface between the two modules in series and out via port 65 and fluid sample return connection 47. In order to block this leakage path, a small O-ring (not shown) is carried in a depression 114 formed in face 55 of each module. Depression 114 is disposed with respect to port 65 of an adjacent module whereby port 65 is aligned centrally of the O-ring to form a seal therewith when adjacent modules are connected in series. Similar depressions 117 carrying small O-rings serve to seal ports 65, 66 and also inlet and outlet passages 45, 46.

Means defining a fluid examination chamber, or cuvette, is disposed and arranged in heat transfer relation with respect to circulating water present in opening 61 whereby sample retained in the fluid examination chamber is conditioned by the temperature of the water.

Thus, as shown in FIGURE 7, a cuvette assembly includes a cylindrical body 67 carried through the side wall of block 54. Cuvette body 67 is formed of a suitable material, for example such as glass, a molded thermoplastic or metal, for example polished stainless steel and includes an end cap 68 press fitted to the end thereof. If desired, cap 68 and body 67 can be formed as a unitary structure. Cap 68 carries capillary passages 45, 46 formed therein and adapted to connect with small tubes. The interior of cuvette body 67 is dimensioned and adapted to receive a suitable probe 69 of known design formed with a sensitive end 70 disposed to extend into a small quantity of fluid sample injected into the cuvette. Probe 69 is provided with an O-ring seal 71 whereby a minimum volume of fluid sample is needed for examination. For example, in a preferred arrangement, passages 45, 46 and the fluid examination chamber for each of three modules, 37 when connected in series one to the other, will consume on the order of one-half cubic centimeter of fluid sample using syringe connections.

Figure 3:
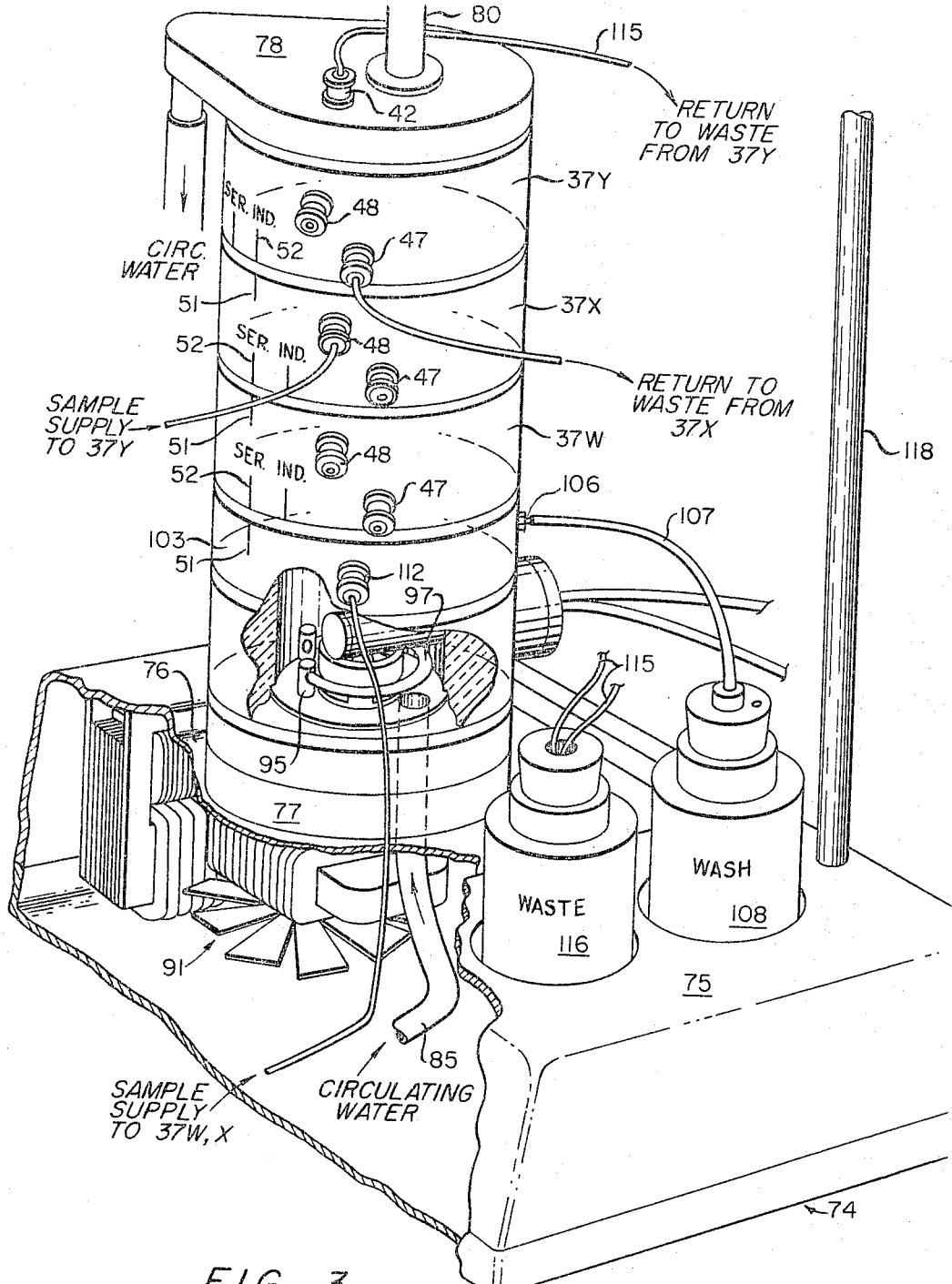
FIGURE 3 is a perspective view, partially broken away, of apparatus according to the invention.

A fluid sample examining apparatus embodying the above described module is arranged in a stack for operation in a laboratory or other examining facility, as shown best in FIGURES 3 and 4. The positional orientation of the modules in the stack in FIGURE 3 does not correspond with that of FIGURE 4. All modules in FIGURE 4 are connected in a single series.

The apparatus comprises generally a plurality of modules each containing means defining a fluid examination chamber, and as shown in the drawing, preferably a cuvette. The modules are disposed in adjacent relation each to the next to form a series thereof. Indexing means are provided whereby the modules are individually readily positionable to selectively connect the outlet passage of one module to the inlet passage of the next or, in the alternative, to connect the outlet passage of one to a fluid sample return connection carried by the next while connecting a fluid sample supply connection carried by the former to the inlet passage of the latter. Two members, one of which is a top closure member, and each of which have a sealing face, are respectively provided with fluid transfer connections for supply and return of fluid sample to the cuvettes. One of the fluid transfer connections of the two members is arranged to be aligned with the inlet passage of the first module of the series and the other fluid transfer connection is aligned with respect to the outlet passage of the last module of the series.

Referring particularly to FIGURES 3 and 4, wherein a number of modules are arranged in a stack, a base member 74 is provided having a top surface 75 formed with a recessed portion 76. Portion 76, in turn, is formed with a raised pedestal 77 for supporting a stack of units including modules 37 of the kind previously described. In FIGURE 3, three such modules identified 37W, 37X and 37Y are provided.

Means for temperature conditioning the cuvettes includes coaxially aligned openings 61 formed in each module together with means for circulating a suitable fluid such as water therethrough. The fluid examination chambers are disposed to extend into heat transfer relation with respect to the water in the openings whereby the temperature of fluid sample in the examination chambers, as well as the temperature of probes inserted therein corresponds to the temperature of the water present in openings 61.

When assembled in a stack, the circulating water openings 61 in each of modules 37 are substantially coaxially aligned and readily releasably retained in such alignment by bands 63 encircling grooves 62, as circulating water moves upwardly through the stack.

The top of the stack is closed by a top closure member 78 carrying fluid sample return connection 42 and provided with an O-ring sealed opening 79 for receiving and suspending a thermometer 80 into openings 61. Thermometer 80 is carried in a manner whereby it can be slidably positioned vertically within the stack as desired. Closure member 78 includes an outlet passage for returning circulating water. The circulating return passage is formed by lateral and vertical conduits 81, 82 and a downwardly depending hose connection 83 which supports a hose 84 adapted to be coupled at its other end to a suitable circulating water return fitting. Circulating water is supplied upwardly through the stack by means of a hose 85, provided at its inlet end (not shown) with suitable fittings. Hose 85 leads upwardly into the stack through a bottom closure member 86 formed to include a sealing face 87 carrying an O-ring seal. In this manner water can be circulated from an independent bath, if desired.

Face 87 is further provided with a raised centering boss 88 adapted to be received in a coacting centering shoulder formed on the bottom face of a modular member next above as noted below. Bottom closure member 86 is secured to pedestal 77 in any suitable manner as by the screws shown, and carries a conduit 89 disposed to extend upwardly therethrough. Conduit 89 is connected to hose 85 for admitting circulating water into the stack. Thus, circulating water from hose 85 can be directed upward through the stack and out via top closure member 78 and conduits 81, 82.

Impeller and heating means are provided for conditioning the temperature of the circulating water whereby the apparatus can be arranged substantially as a self-contained unit. Thus, a ducted impeller 90 is carried coaxially of the openings 101 of the stack and arranged to be driven by a motor 91 acting through shaft means 92. The impeller blade is encircled by a cylindrical ducting member 93 formed to admit water from below via a relieved portion 94 of sleeve 93. Thus, conduits 89 and 82 can be plugged, if desired and the water column in the stack recirculated.

Heating means for conditioning the circulating water include a pair of terminal posts 95, 96 supporting in their upper ends a heating filament 97. Filament 97 is retained as by means of screws. The lower ends of terminal posts 96 are connected to electrical leads retained in transverse holes. Means for thermostatically controlling energizing of filament 97 includes a suitable temperature sensing transducer element 98 of conventional design. Temperature sensor 98 is carried in a modular block 99 provided with upper and lower sealing faces 101, 102, similar to faces 55, 56.

It has been found that the equipment must be operated for a limited period of time before the temperature of the probes and in the examination chambers becomes fully and reliably stabilized. Accordingly, after a sample has been examined, tested or inspected by the probe, it must be removed by injection of a detergent wash fluid in order to prevent contamination of the next sample injected. In order to prevent disruption of the stabilized temperature condition of the equipment, there is provided means forming a fluid reservoir. The reservoir includes one wall having a high coefficient of heat transfer disposed in contact with the circulating water. Thus, heat transfer through the wall from the circulating water is utilized to precondition wash fluid carried in the reservoir. Means are provided which serve to transfer fluid into and out of the reservoir and to replenish fluid withdrawn whereby the wash fluid withdrawn from the reservoir is conditioned substantially to the temperature of the circulating water and is ready for injection into the system to remove all traces of the prior fluid samples.

Means for preconditioning wash fluid is carried in the stack directly above block 99 and includes a modular block 103 having upper and lower sealing surfaces, as previously described, block 103 is formed to include an annular fluid reservoir 104 provided with a cylindrically shaped inner wall 105 disposed to be coaxially aligned with openings 61 in modules 37. Wall 105 is formed of a suitable material such as aluminum having a high coefficient of heat transfer whereby circulating water moving therethrough will exchange heat with wash fluid carried in reservoir 104. Reservoir 104 includes an inlet 106 connected to a tube 107 which leads to a vented bottle 108 of detergent wash fluid. Tube 107 dips into fluid in bottle 108 whereby as fluid is removed from reservoir 104 it is replenished by fluid drawn out of bottle 108. To remove fluid from reservoir 104 an outlet connection 109 is provided with a valve 110 formed with a hypodermic connection 111. As thus arranged a hypodermic syringe can be fastened to connection 111 while valve 110 is closed. Subsequently, by opening valve 110 and withdrawing the plunger in the syringe, wash fluid from reservoir 104 can be withdrawn. The wash fluid withdrawn is immediately replaced by fluid from bottle 108 supplied via tube 107. Finally, block 103 carries a fluid sample supply connection 112 disposed to be aligned with inlet passage 45W in FIGURE 4.

Finally those fluid sample return connections 47 which are disposed in a couple relation with an associated outlet passage 46 are connected by tubes 115 leading back to a waste bottle 116 carried in base member 74. Base member 74 carries, in addition, an upright post 118 adapted to support appliances which may be used in conjunction with probes 69. For example, a conventional probe for testing the pH of a fluid sample employs an auxiliary appliance and thus such equipment can be conveniently supported. It has been found desirable to examine the pH of a fluid sample in the last module prior to returning the sample to waste for the reason that the fluid sample is normally considered to be contaminated by the pH examination.

It will be observed in the drawings that fluid sample is indicated as being supplied via small tubes connected to fluid sample connections 48 (or 112). Fluid sample can ge supplied in any suitable manner and preferably and in most instances, will be supplied by means of direct injection from a hypodermic syringe, releasably coupled to the desired connection 48. Tubes, however, may be employed where the sample examination is to be on a continuing or flow-through basis.

The operation of equipment of the kind described is substantially as generally outlined above and will be only briefly reviewed at this time.

In FIGURE 3, it is assumed that two fluid samples are to be examined or inspected by probes 69 suitable for the purpose. The first sample is to be examined for $pO_2$ and $pH_a$ and the second sample is to be examined solely for pH. Modules 37W and 37X are connected in series whereby the first fluid sample can be injected into the cuvette formed in each. A "series" connection of the modules 37W, 37X is indicated by alignment of scribe mark 52S of 37W with scribe mark 51 inscribed on reservoir module 103 and by the alignment of scribe mark 52S of 37X with mark 51 of module 37W. Fluid sample can then be injected into connection 112 where it follows a path upwardly to inlet passage 45W, cuvette 43W, outlet passage 46W to inlet passage 45X, to the cuvette in module 37X aligned with the fluid sample return connection 47 carried in module 37Y. This latter alignment is effected by clockwise rotation of module 37Y with respect to module 37X whereby scribe mark 51 of module 37X is aligned with scribe mark 52I of module 37Y. The latter scribe mark is identified by the abbreviation "*ind*" which stands for independent or individual operation, with respect to the module next below. Module 37Y is, thereby conditioned to be operated separate from the series-connected pair of modules 37W, 37X whereby pH of a second sample can be injected by fluid sample supply connection 48X and withdrawn from fluid sample return connection 42 carried in top closure member 78.

As previously described in general, with respect to FIGURE 2, where it is desired to "skip over" a module or more, connections can be made as shown in FIGURE 10. As there shown the cuvette formed in module 37S is series connected to the cuvette formed in module 37U by skipping over the cuvette of module 37T. A jumper line 49 is coupled to interconnect 47T and 48T thereby interconnecting the outlet from module 37S to the inlet of module 37U. At the same time if it is desired to utilize module 37T, sample can be fed to the cuvette formed therein by means of an input to connection 48S and sample withdrawn via outlet connection 47U. In this arrangement, it is to be noted that the scribe marks are disposed to indicate that each module is indexed to show "independent" operation with respect to the module next below.

Further description of the utilization and operation of the equipment is not considered to be warranted to further explain the arrangement in FIGURE 4 as establishing a plurality of three modules 37W, 37X and 37Y as being disposed and interconnected to operate in a series of three. Accordingly, three examinations of the same fluid sample can be accomplished by the structure as indexed in FIGURE 4.

We claim:
1. In a fluid sample examining apparatus having a pair of members each having a sealing face, a port in said faces, a fluid connection carried on an exposed surface of each member, and a fluid passage disposed to extend between the connectiton and the port in each member, and having a plurality of cuvette modules readily releasably retained between said members, each said module comprising a block formed to include a pair of sealing faces each adapted to form a sealed interface either with the faces of said members or the sealing faces of another of said modules, a port in each sealing face of said block, a pair of fluid connections carried on a surface of said block adapted to be exposed in use, a fluid passage disposed to extend between each said connection of the block and a respective one of said ports of the block, means defining a fluid examination cuvette chamber carried by said block and adapted to receive a sample examining probe therein, an inlet and an outlet passage respectively extending generally between one of said block faces and said chamber, the ends of said inlet and outlet passages remote from said chamber being formed and disposed to be respectively indexed into alignment with the ports of said faces adjacent thereto, or to connect the outlet of one chamber to the inlet of another to provide a fluid path through said connected chambers from one to the next.

2. A fluid sample examining apparatus comprising a plurality of cuvette modules, each module comprising means defining a fluid examination chamber, inlet and outlet passages communicating with said chamber, and a pair of fluid transfer connections carried by each module for supply and return of fluid sample to be examined in the chamber of another module, said modules being disposed in adjacent relation each to the next to form a series thereof, indexing means readily positionable to selectively connect the outlet passage of one module to the inlet passage of the next, or to connect the outlet passage of said one to a fluid sample return connection carried by the next while connecting a fluid sample supply connection carried by said one to the inlet passage of said next, and a pair of members each having a sealing face and each carrying a fluid transfer connection, the fluid transfer connection of one of said members being aligned with the inlet passage of the first module in the series, and the fluid transfer connection of the other member being aligned with the outlet passage of the last module in the series, each module further comprising a block formed to include a pair of sealing faces each adapted to form a sealed interface with the faces of said members or the sealing faces of another of said blocks, said blocks being formed to include an opening for passing circulating water therethrough, said chamber being disposed to extend into heat transfer relation with respect to water passing through said opening, a wash water preconditioning unit including means forming a fluid reservoir carried between a pair of said sealing faces, one wall of said reservoir having a high coefficient of heat transfer, said wall being cylindrically disposed in substantial alignment with the openings in said blocks to pass the circulating water and water in said reservoir, and means serving to transfer fluid into and out of said reservoir whereby wash fluid withdrawn from said reservoir is conditioned to substantially the temperature of the circulating water.

3. Fluid sample examining apparatus as defined in claim 2 further including impeller means for circulating thermally conditioned water into heat transfer relation with respect to said chamber.

4. Fluid sample examining apparatus as defined in claim 3 formed as a self-contained apparatus and further including a base member supporting said modules, and means carried in said base member serving to heat said circulating water to a predetermined temperature.

5. A fluid sample examining apparatus comprising:
   a plurality of cuvette modules, each said module comprising a block formed to include a pair of sealing faces;
   said blocks being disposed in series with the sealing face of each said block forming a sealed interface with the sealing face of the adjacent block;
   a port in each sealing face of said block;
   a pair of fluid connections carried on an exposed surface of said block;
   a fluid passage disposed to extend between each said connection of the block and a respective one of said ports of the block;
   means defining a fluid examination cuvette chamber carried by said block, said chamber being open at one end at an exposed surface of said block and closed at the other end so as to be adapted to receive a sample examining probe therein inserted into said open end; and
   inlet and outlet passages respectively connected to the closed end of said chamber, the ends of said inlet and outlet passages remote from said chamber terminating in respective faces of said block and disposed in predetermined spaced relation with respect to said ports so as to be in alignment with the ports of said faces adjacent thereto in one position of said blocks, or so as to connect the outlet passage of one chamber to the inlet passage of another to provide a fluid path through said connected chambers from one to the next in another position of said blocks, and said blocks being readily movable from said one position to said other position.

6. An apparatus as set forth in claim 5 including:
   sealing means interposed between the sealing faces of adjacent pairs of said blocks; and
   readily releasable means retaining said sealing faces in sealed face-to-face relation notwithstanding movement of adjaccent pairs of said blocks from said one position to said other position of said blocks.

7. A fluid sample examining apparatus comprising:
   a plurality of cuvette modules, each said module comprising a generally cylindrical block having substantially flat sealing faces at opposite ends thereof;
   said blocks being disposed in series with the sealing face of each said block forming a sealed interface with the sealing face of the adjacent block;
   each block being rotatable with respect to the adjacent block about an axis passing through the center of the faces of said blocks;
   a port in each sealing face of said block;
   a pair of fluid connections carried on the exposed cylindrical surface of said block;
   a fluid passage disposed to extend between each said connection of the block and a respective one of said ports of the block;
   means defining a fluid examination cuvette chamber carried by said block, said chamber being open at one end at the cylindrical surface of said block and closed at the other end so as to be adapted to receive a sample examining probe therein inserted into said open end;
   inlet and outlet passages respectively connected to the closed end of said chamber, the ends of said inlet and outlet passages remote from said chamber terminating in respective faces of said block and disposed in predetermined spaced relation with respect to said ports so as to be in alignment with the ports of said faces adjacent thereto in a first position of said blocks, or so as to connect the outlet passage of one chamber to the inlet passage of another to provide a fluid path through said connected chambers from one to the next in a second position of said blocks angularly displaced from said first position; and
   said block including indexing means for selectively rotating said block with respect to the adjacent block to said first or said second position.

8. An apparatus as set forth in claim 7 including:
   an O-ring interposed between the sealing faces of adjacent pairs of said blocks; and
   readily releasable means retaining said sealing faces in sealed face-to-face relation notwithstanding relative rotation of adjacent pairs of said blocks.

9. A modular unit for forming a fluid sample examining apparatus, said modular unit comprising:
   a block formed to include a pair of opposed sealing faces adapted to form a sealed interface with the sealing face of another of said blocks when disposed in adjacent relation thereto to form a series of said modular units whereby the surface of said block other than said faces is adapted to be exposed;
   a port in each sealing face of said block;
   pair of fluid connections carried on the exposed surface of said block;
   a fluid passage disposed to external between each said connection of the block and a respective one of said ports of the block;
   means defining a fluid examination cuvette chamber carried by said block, said chamber being open at one end at an exposed surface of said block and closed at the other end so as to be adapted to receive a sample examining probe therein inserted into said open end;
   inlet and outlet passages respectively connected to the closed end of said chamber, the ends of said inlet outlet passages remote from said chamber terminating in respective faces of said block and disposed in predetermined spaced relation with respect to said ports so as to be in alignment with the ports of a like adjacent block in a first position of the blocks, or so as to connect the outlet passage of one chamber to the inlet passage of another chamber of an adjacent block to provide a fluid path through the connected chambers from one to the next in a second position of the blocks; and
   said block including indexing means for selectively positioning said block with respect to a like adjacent block in either said first or said second position.

References Cited
UNITED STATES PATENTS

| | | | |
|---|---|---|---|
| 2,462,293 | 2/1949 | Thomas | 324—30 |
| 2,583,276 | 1/1952 | Patnode | 324—30 |
| 2,886,771 | 5/1959 | Vincent | 324—30 |
| 3,106,845 | 10/1963 | Dimmick | 73—425.6 |
| 3,151,052 | 9/1964 | Arthur et al. | 324—30 X |
| 3,259,462 | 7/1966 | Anscherlik | 23—253 X |

WALTER L. CARLSON, *Primary Examiner.*

FREDERICK M. STRADER, *Examiner.*

RUDOLPH V. ROLINEC, C. F. ROBERTS,
*Assistant Examiners.*